Apr. 10, 1923.
K. THULANDER
1,451,128
CARVING TOOL
Filed Oct. 29, 1920
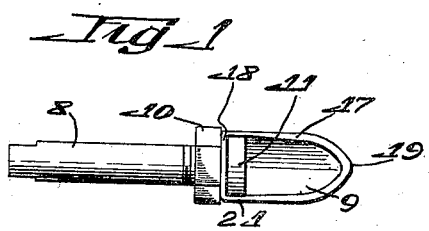
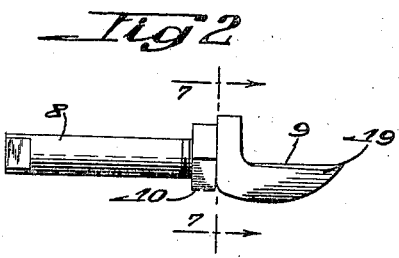
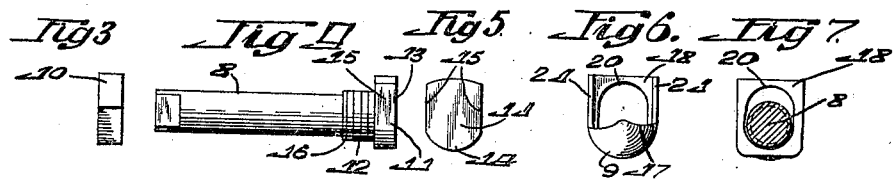
Inventor
Kanstantine Thulander
By- [signature]
Atty.

Patented Apr. 10, 1923.

1,451,128

UNITED STATES PATENT OFFICE.

KONSTANTINE THULANDER, OF ROCKFORD, ILLINOIS, ASSIGNOR TO L-T-L COMPANY, OF ROCKFORD, ILLINOIS, A CORPORATION OF ILLINOIS.

CARVING TOOL.

Application filed October 29, 1920. Serial No. 420,354.

*To all whom it may concern:*

Be it known that I, KONSTANTINE THULANDER, a subject of Sweden, residing at Rockford, in the county of Winnebago and State of Illinois, have invented certain new and useful Improvements in Carving Tools, of which the following is a specification.

This invention pertaining in general to carving tools, has more particular reference to bits, such as are used in carving machines of that class in which a bit or blade revolving at a high speed is controlled in the carving operation by a master pattern.

These bits require frequent sharpening; and the bits heretofore employed have been unsatisfactory in that their construction permits of resharpening only to a small extent, thus rendering the cutting blades relatively short-lived.

The primary object of the present invention is to provide a bit for carving machines constructed in such novel manner as to materially increase the longevity of a tool of this kind.

I have also aimed to provide a carving tool of the character described including a cutting blade and a shank adjustably associated in a novel manner, whereby the blade may be adjusted relatively to the axis of the shank for the purpose of properly resetting or aligning the blade with respect to the shank after sharpening.

Another object is to provide a cutting blade and a shank constructed to interfit and be clamped together in such novel manner that the torsional thrust will be very effectively carried and so that the blade will be very securely locked in connection with the shank.

Other objects and attendant advantages will be appreciated by those familiar with this art as the invention becomes better understood by reference to the following description when considered in connection with the accompanying drawing, in which—

Figure 1 is a face view of a carving tool embodying my invention;

Fig. 2, a side view of the tool;

Fig. 3, an edge view of the clamping nut;

Figs. 4 and 5, side and end views of the shank;

Fig. 6, an end view of the blade removed from the shank; and

Fig. 7, a sectional view taken on the line 7—7 of Fig. 2.

My invention contemplates the provision of a carving tool consisting, generally stated, of three parts, viz: a shank 8, a cutting blade 9, and a clamping nut 10. The shank stock might be of any suitable shape to fit in a chuck, spindle socket or other driving means, and is shaped to provide a head 11 defined by a shoulder 12, a flat face 13, a curved peripheral portion 14 and flat parallel peripheral faces 15. That portion 16 of the shank contiguous to the shoulder 12 is threaded for engagement of the clamping nut 10.

The cutting blade proper might be any of various shapes, depending on the particular character of the work at hand. The particular blade shown is known as a roughing cutter and has an inclined cutting edge 17 extending substantially from the base 18 to the point or apex 19. The base 18 of the blade has an elongated opening or slot 20 and is shaped to provide raised edges or walls 21 parallel with the elongation of the slot and of an inside dimension corresponding to the distance between the faces 15 on the shank head.

The foregoing parts may be assembled in the manner shown in Fig. 1, with the shank passing through the slot 20, the head 11 disposed between the walls 21 and the nut 10 turned to rigidly clamp the blade between the head 11 and the nut. In assembling the tool, the blade will be set so that the point 19 is in alignment with the longitudinal axis of the shank and locked in this position. After the cutting edge has been sharpened, it will be necessary to reset the blade to realign the point, this being done by loosening the nut 10 and shifting the blade on the shank in the plane of the slot, and tightening the nut when the blade is properly positioned. It will be observed that the sides 21 of the blade embrace and engage the flat sides 15 of the shank head, thus securely holding the blade against any rotative movement with respect to the shank and constituting a very substantial and effective union between these parts, whereby the torsional strain will be efficiently carried. It should be manifest that the parts employed in this tool are capable of economical production and will give greater service than those tools of a similar character in which it is necessary to bend the blade when resetting.

It is believed that the foregoing conveys a clear understanding of the objects prefaced above, and while I have illustrated and described but a single working embodiment, it should be understood that various changes might be made in details of construction without departing from the spirit and scope of the invention as expressed in the appended claims, in which—

I claim:

1. A bit for carving machines comprising a shank having a head with flat sides, a carving blade the base of which has a slot and is shaped to embrace said flat sides, and a nut threadingly engaging the shank for clamping the blade to the head.

2. A carving tool of the character described, comprising a headed shank, a carving blade having a base slotted for the reception of the shank and shaped to receive the headed end thereof, said slot permitting transverse adjustment of the blade on the shank, and means for clamping the blade to the shank in any adjusted position.

3. A carving tool of the character described, comprising a shank, a carving blade having a base portion adjustable transversely on the shank and fitted thereon to take the torsional thrust, and a nut threaded on the shank for clamping the blade in any adjusted position.

4. A carving tool of the character described, comprising a shank, a carving blade having a base provided with opposed thrust faces associated with complemental faces on the shank and being adjustable transversely to the shank in the plane of said faces, and a nut threaded on the shank for clamping the blade thereto in any adjusted position.

5. A carving tool of the character described comprising a shank having a head with flat sides, a carving tool having a base slotted for the reception of the shank only, said base having side walls for thrust against said sides of the head, and means for clamping the blade to said head.

6. A carving tool of the character described, comprising a headed shank, a carving blade having a base slotted for the reception of the shank and having thrust walls adapted to bear against opposed sides of the shank head, and a nut threaded on the shank for clamping the base of the blade against the head of the shank.

KONSTANTINE THULANDER.